United States Patent
Kataoka et al.

(10) Patent No.: US 12,249,094 B2
(45) Date of Patent: Mar. 11, 2025

(54) INTER-DEVICE POSITIONAL RELATIONSHIP ESTIMATION DEVICE, INTER-DEVICE POSITIONAL RELATIONSHIP ESTIMATION METHOD, AND PROGRAM

(71) Applicant: Nippon Telegraph and Telephone Corporation, Tokyo (JP)

(72) Inventors: Misao Kataoka, Musashino (JP); Hirofumi Noguchi, Musashino (JP); Takuma Isoda, Musashino (JP); Kyota Hattori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 349 days.

(21) Appl. No.: 17/799,963

(22) PCT Filed: Feb. 17, 2020

(86) PCT No.: PCT/JP2020/006067
§ 371 (c)(1),
(2) Date: Aug. 16, 2022

(87) PCT Pub. No.: WO2021/166032
PCT Pub. Date: Aug. 26, 2021

(65) Prior Publication Data
US 2023/0067207 A1 Mar. 2, 2023

(51) Int. Cl.
*G06T 7/73* (2017.01)
(52) U.S. Cl.
CPC ...... *G06T 7/73* (2017.01); *G06T 2207/10016* (2013.01)

(58) Field of Classification Search
CPC .... G06T 7/70; G06T 7/73; G06T 7/80; G06T 2207/10016; G06T 2207/30232; G06T 7/292
See application file for complete search history.

(56) References Cited

U.S. PATENT DOCUMENTS

2009/0268033 A1* 10/2009 Ukita ................ G06T 7/292
348/169
2010/0128110 A1* 5/2010 Mavromatis ...... G08B 13/19641
348/E13.001
(Continued)

OTHER PUBLICATIONS

Kataoka et al., "Tacit computing and its application for open IoT era", 15th IEEE Annual Consumer Communications & Networking Conference (CCNC), 2018, 5 pages.

*Primary Examiner* — Oneal R Mistry
*Assistant Examiner* — Duy Tran
(74) *Attorney, Agent, or Firm* — Fish & Richardson P.C.

(57) ABSTRACT

An inter-device positional relationship estimation apparatus includes an analysis information acquisition unit that acquires time-series analysis information, a recommendation processing unit that estimates unanalyzed detailed information in time-series analysis information applying a predetermined recommendation algorithm, an initial map creation unit that calculates a neighborhood determination point indicating a degree of correlation of detailed information between fixed devices to create an initial map, and a device relationship map creation unit that calculates neighborhood points indicating a degree of correlation of detailed information between respective devices including a moving device or/and a new fixed device to calculate a detection probability and a movement time between devices and create a device relationship map.

6 Claims, 13 Drawing Sheets

(56) References Cited

U.S. PATENT DOCUMENTS

2012/0008831 A1\* 1/2012 Tanigawa ............. G01B 11/002
    382/103
2012/0147191 A1\* 6/2012 Snoussi ............ G08B 13/19608
    382/103
2019/0266415 A1\* 8/2019 Oami ..................... H04N 7/181

\* cited by examiner

INTER-DEVICE POSITIONAL RELATIONSHIP ESTIMATION DEVICE, INTER-DEVICE POSITIONAL RELATIONSHIP ESTIMATION METHOD, AND PROGRAM

CROSS-REFERENCE TO RELATED APPLICATION

This application is a National Stage Application under 35 U.S.C. § 371 of International Application No. PCT/JP2020/006067, having an International Filing Date of Feb. 17, 2020. The disclosure of the prior application is considered part of the disclosure of this application, and is incorporated by reference in its entirety into this application.

TECHNICAL FIELD

The present invention relates to an inter-device positional relationship estimation apparatus for estimating a positional relationship between devices, an inter-device positional relationship estimation method, and a program.

BACKGROUND ART

As a case of use of a service using the Internet of Things (IoT), tracking of a movement of an individual using image information acquired from a camera device is assumed (see NPL 1). In a technology described in NPL 1, videos from all camera devices connected to a concerned network are analyzed and a concerned individual is detected so that a moving individual is tracked.

CITATION LIST

Non Patent Literature

[NPL 1] Misao Kataoka, et al., "Tacit computing and its application for open IoT era", 2018 15th IEEE Annual Consumer Communications & Networking Conference (CCNC)

SUMMARY OF THE INVENTION

Technical Problem

However, in the related art, unless positional information of devices is obtained by a position detection means such as a global positioning system (GPS), a positional relationship between the devices is not known, and thus, even when an individual that is a target is observed at a certain time, it is not known which device the individual can be observed by at the next time. Thus, in order to observe the individual, which is a target, it is necessary to execute analysis processing in each of the devices. There are a large number of surveillance cameras, including surveillance cameras with high performance including a GPS or the like, and surveillance cameras not including a position detection means such as a GPS.

The present invention has been made in view of such a point, and an object of the present invention is to estimate a positional relationship between devices without using a position detection means such as a GPS.

Means for Solving the Problem

An inter-device positional relationship estimation apparatus according to the present invention includes: an analysis information acquisition unit configured to acquire time-series analysis information of a target to be imaged obtained by each of devices, as time-series analysis information; a recommendation processing unit configured to when detailed information indicating features of the target has not been analyzed at a certain time in the time-series analysis information, by using detailed information of another time of the same device and detailed information of another device different from this device to estimate unanalyzed detailed information applying a predetermined recommendation algorithm, and generate time-series analysis information including the estimated detailed information; an initial map creation unit configured to, by referring to the time-series analysis information including the estimated detailed information, calculate neighborhood determination points indicating a degree of correlation of the detailed information between fixed devices among the devices, extract the devices of which the calculated neighborhood determination points are equal to or larger than a predetermined first threshold value as neighboring device candidates, and calculate a detection probability between the devices and a movement time between the devices based on time-series target detection information indicated by the detailed information of the extracted neighboring device candidates to create an initial map; and a device relationship map creation unit configured to, by referring to the time-series analysis information including the estimated detailed information, set and calculate neighborhood points indicating a degree of correlation of detailed information between the devices including a moving device or/and a new fixed device to be higher when a time is closer to a current time as compared with the past and to be imparted to a device present in a narrower range when a distance to a device to be calculated obtained from a movement time of the target of the initial map is closer to a current distance, determine a device of which the calculated neighborhood points are equal to or larger than a predetermined second threshold value to be a neighboring device, and calculate a detection probability between the devices and a movement time between the devices based on the time-series target detection information indicated by the detailed information of the determined neighboring device to create a device relationship map.

Effects of the Invention

According to the present invention, it is possible to estimate positional relationships between devices without using a position detection means such as a GPS.

DESCRIPTION OF EMBODIMENTS

Next, a mode for carrying out the present invention (hereinafter referred to as an "embodiment") will be described. First, an overview of the present invention will be described.
<Overview>

Figure 1:
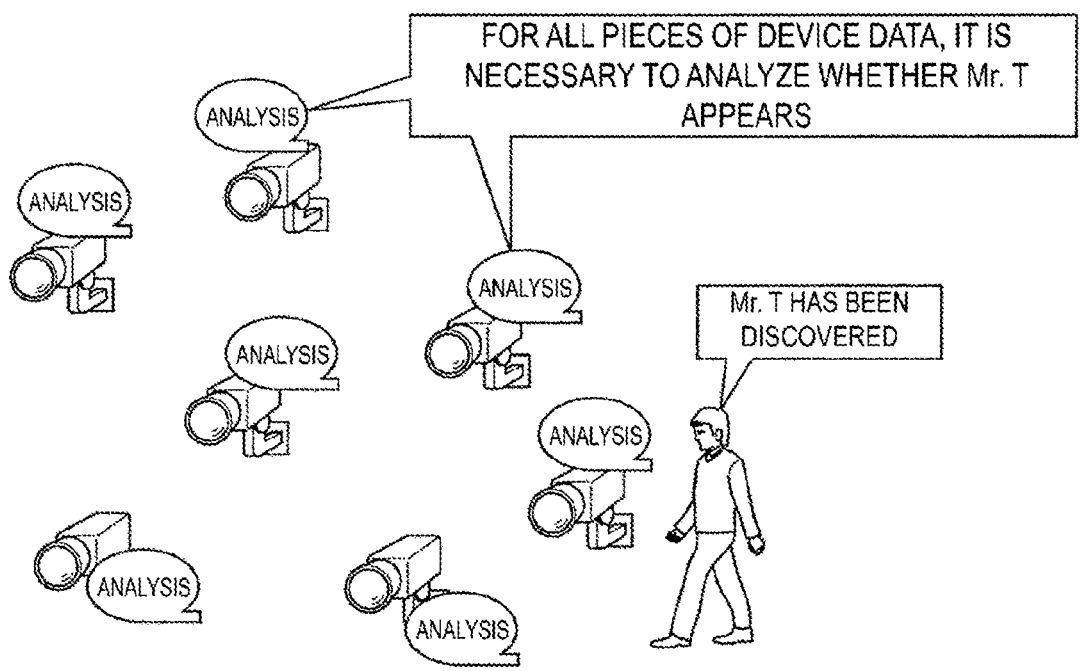
FIG. 1 is a diagram illustrating an example of a device system of the related art that performs tracking of movement of an individual.

When tracking of a movement of an individual that is a target (hereinafter may be referred to as "target individual") is performed, it is known in the related art that, unless positional information of devices is obtained by a position detection means such as a GPS, a positional relationship between the devices cannot be ascertained and thus, even when a specific device detects the target individual at a certain time, it is not known which device will detects the target individual next time. Thus, every one of the devices need to analyze data that the device has captured, and then discover the target individual (for example, Mr. T), as illustrated in FIG. 1.

The inter-device positional relationship estimation apparatus 1 (see FIG. 4 to be described below) according to the present embodiment, by using information (image analysis information) acquired by each device, calculates a relationship for positions between the devices (hereinafter referred to as a "positional relationship").
Even when information captured by respective devices (human or vehicle information) is similar, in a case in which positional information of the devices is unclear, the devices are not necessarily physically close to each other. Thus, the inter-device positional relationship estimation apparatus 1 considers a movement of devices or movement information of the target (a person, a vehicle, or the like) that can be captured by the devices to estimate whether or not the respective devices are physically close to one another.

Figure 2:
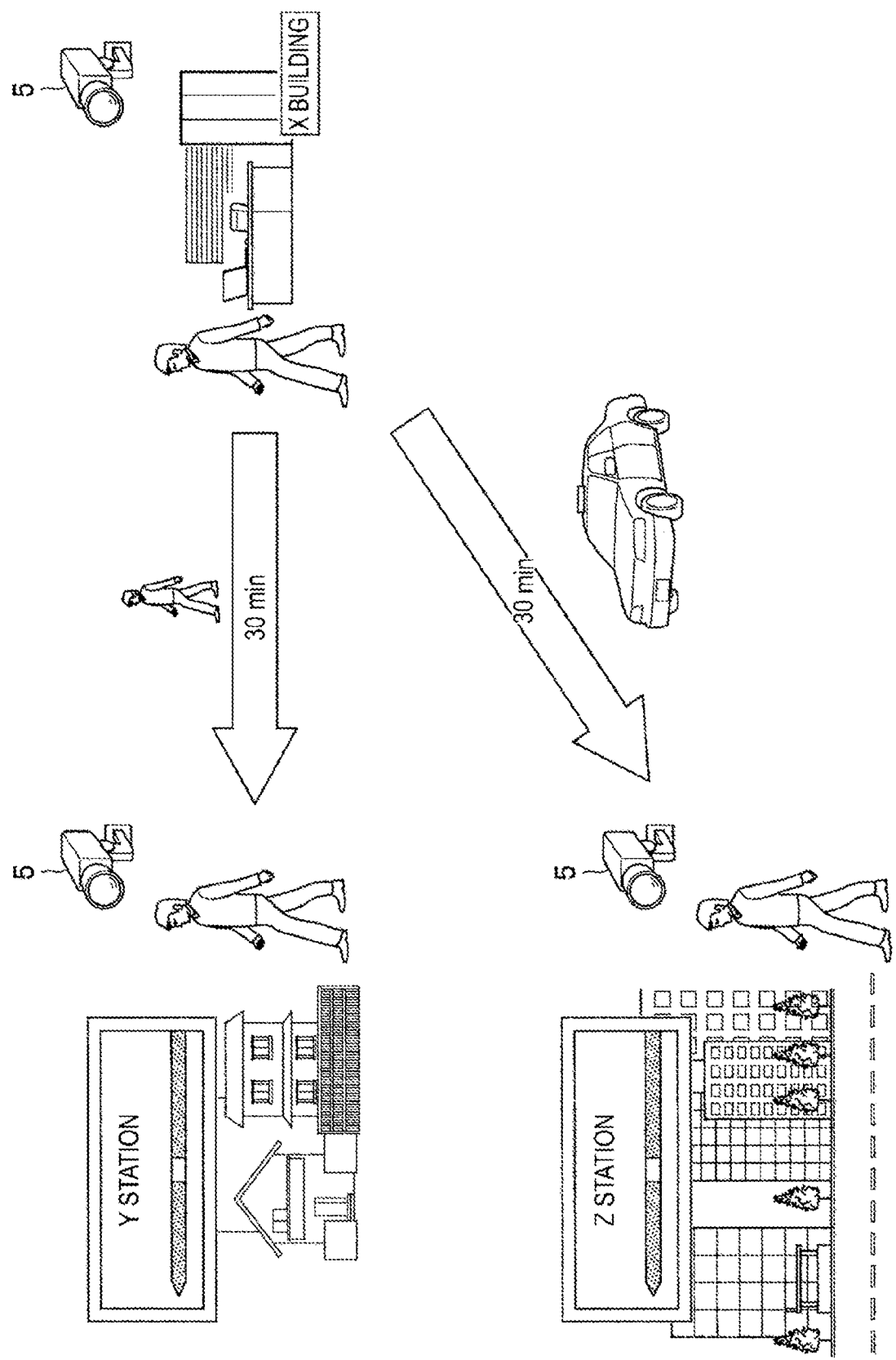
FIG. 2 is a diagram illustrating a positional relationship between devices according to a present embodiment.

It is assumed that the positional relationship between the devices according to the present embodiment does not necessarily match the closeness of geographical positions, and is expressed according to how far a target moving between the devices moves. For example, as illustrated in FIG. 2, when a person (Mr. T) observed by a device 5 of an X building moves on foot, the person is observed by a device 5 of a Y station after 30 minutes. On the other hand, when the person (Mr. T) observed by the device 5 of the X building moves in a vehicle (taxi), the person is observed by a device 5 of a Z station at some distance from the Y station after 30 minutes.

Thus, the positional relationship between devices is expressed by a target (a detection target of which a movement speed can be defined) and a movement time thereof. For example, when the target is "human", the target moves on foot and the movement speed is x km/s. When the target is a "vehicle", the movement speed is y km/s. The movement speed may be set in advance or a value obtained by analyzing a video acquired from the device 5 may be used.

The positional relationship between the devices is expressed by the target (the target to be detected of which the movement speed can be defined) and the movement time because a search range is narrowed down differently depending on how far the target is likely to have moved when a certain time has passed after the target is observed at a certain point in time in a case in which a service called tracking of movement of a target is provided.

Further, the present embodiment has a premise that each device constantly acquires (analyzes) general-purpose information, whereas the device does not constantly acquire information in which it is necessary to perform special analysis on data captured by the device, such as more detailed information (detailed information) or information for identifying an individual (individual information). Here, general-purpose information is information of a category which is widely exhibited such as in humans or vehicles. For example, it is possible to analyze, for example, how many people have passed or how many vehicles have passed, based on this general-purpose information. The detailed information is information indicating features of the target, such as clothes (suits) of a man in his twenties and a vehicle body color (red) of a vehicle model a of a vehicle manufacturer H. This detailed information is often used, for example, in marketing for analyzing visitors in stores, event venues, and the like. The individual information is Taro Tanaka which identifies an individual, or information for identifying an individual (for example, a vehicle owned by Taro Tanaka). This individual information is used for tracking of a movement of the individual.

Under the above premise, detailed information or individual information may be desired to be used instead of general-purpose information depending on services provided to a user. In this case, each device performs detailed analysis for associating the captured data with the service. For example, in the case of a service for capturing a video at a current point in time of a specific child (a lost child) who is a human, it is also necessary to analyze individual information. In the present embodiment, an analysis result of data analyzed by a certain service can be used as reference information when other services are executed.

The inter-device positional relationship estimation apparatus 1 according to the present embodiment, by using statistical information in which a past movement of the target can be reflected, estimates the positional relationship between the devices in a situation in which only general-purpose information is constantly acquired by the device.

Figure 3:
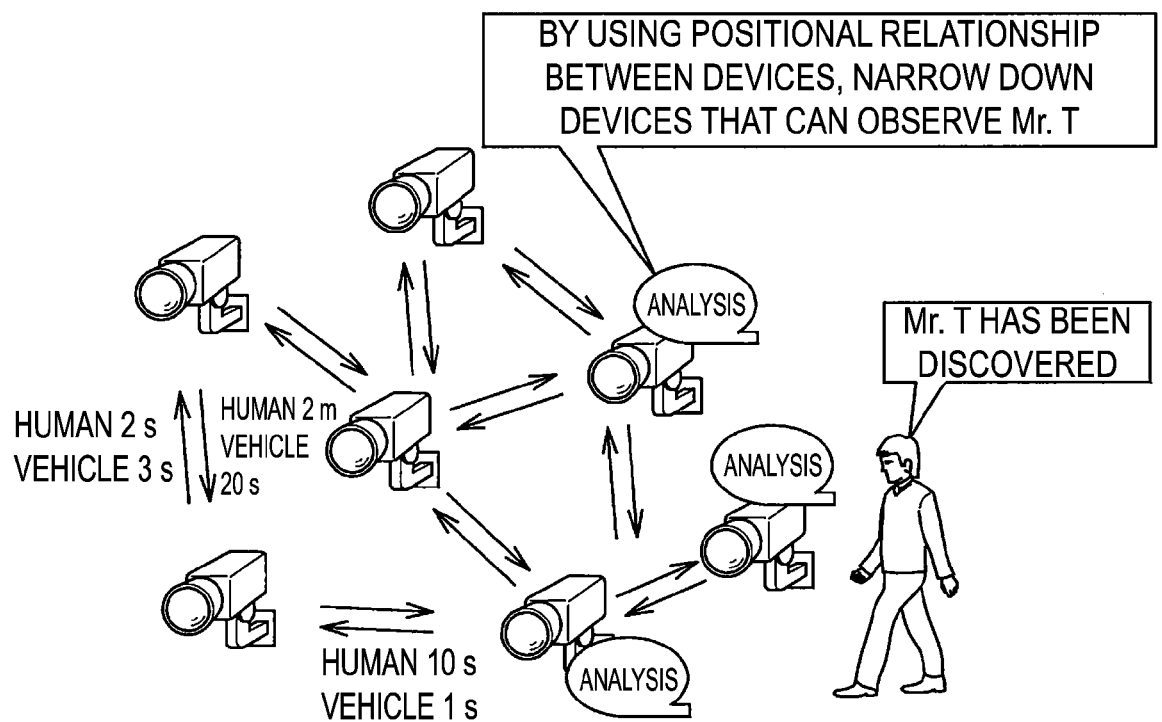
FIG. 3 is a diagram illustrating an example of a device system showing a positional relationship between devices according to the present embodiment.

The positional relationship between the devices is expressed as "human 20 s (seconds)", "human 3 m (minutes)", "vehicle 3 s (seconds)", and the like, as illustrated in FIG. 3. The inter-device positional relationship estimation apparatus 1 creates the positional relationship between devices as a device relationship map for each target (for example, a human or a vehicle).

By using this device relationship map, it becomes possible to efficiently narrow down devices likely to capture data that is intended (hereinafter referred to as "neighboring devices") when a certain service is desired to be used.

Hereinafter, the inter-device positional relationship estimation apparatus 1 according to the present embodiment will be described in detail.

<Present Embodiment>

Figure 4:
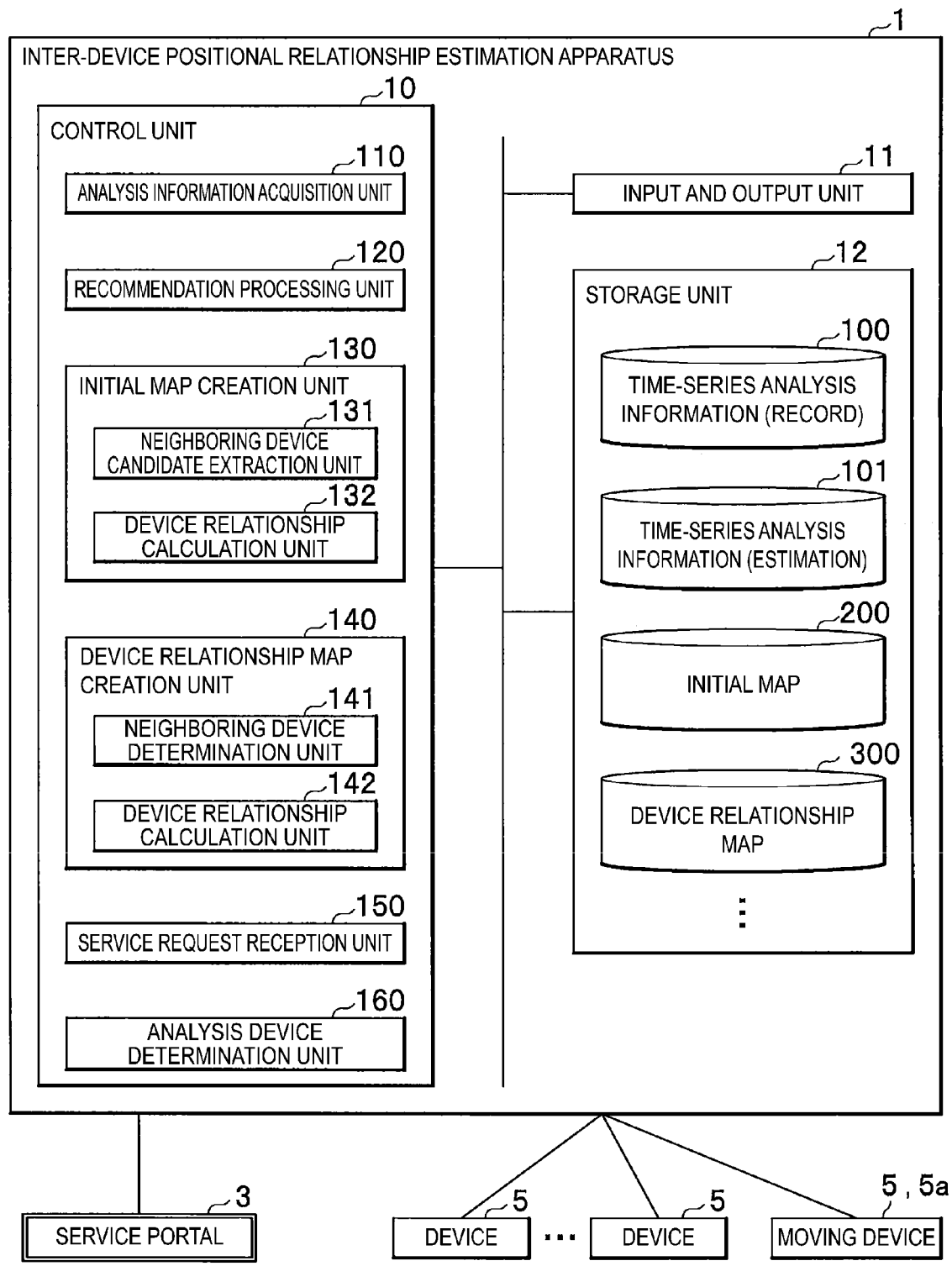
FIG. 4 is a block diagram illustrating a configuration of an inter-device positional relationship estimation apparatus according to the present embodiment.

FIG. 4 is a block diagram illustrating a configuration of the inter-device positional relationship estimation apparatus 1 according to the present embodiment.

The inter-device positional relationship estimation apparatus 1 executes, as processing for creating a device relationship map at a certain time and estimating neighboring devices, (1) creation of an initial map based on a fixed device (initial map creation processing), (2) updating of the map by adding a new device including a moving device (device relationship map creation processing), and (3) a determination of a device on which data is to be analyzed using the device relationship map (device-to-be analyzed determination processing) (details will be described below).

The inter-device positional relationship estimation apparatus 1 is communicatively connected to a plurality of devices 5 and a service portal 3.

The device 5 is, for example, a surveillance camera and is a camera device that captures video data. This camera device executes analysis processing on the captured video data under preset conditions, and transmits a result of the analysis to the inter-device positional relationship estimation apparatus 1. The device 5 itself does not analyze the captured data, but a computer device connected to the device 5 may capture the data from the device 5, analyze the data, and transmit a result of the analysis to the inter-device positional relationship estimation apparatus 1. This device 5 further includes a moving device such as an in-vehicle camera or smartphone, in addition to a fixed device such as a surveillance camera.

The service portal 3 acquires a service request for tracking of a movement of an individual from a user terminal (not illustrated) and outputs the service request to the inter-device positional relationship estimation apparatus 1. The service portal 3 receives information on a device that is to be analyzed (a device to be analyzed) for tracking an individual from the inter-device positional relationship estimation apparatus 1, and executes data analysis processing of the device.

The inter-device positional relationship estimation apparatus 1 includes a control unit 10, an input and output unit 11, and a storage unit 12.

The input and output unit 11 inputs or outputs information to or from another device (the device 5, the service portal 3, or the like). The input and output unit 11 includes a communication interface that performs transmission and reception of information via a communication line, and an input and output interface that performs input and output of information between an input device such as a keyboard and an output device such as a monitor (not illustrated).

The storage unit 12 includes a hard disk, a flash memory, a random access memory (RAM), and the like.

Time-series analysis information (record) 100, time-series analysis information (estimation) 101, an initial map 200, device relationship map 300, and the like are stored in the storage unit 12 (details will be described below).

Further, a program for executing each functional unit of the control unit 10 and information necessary for processing of the control unit 10 are temporarily stored in the storage unit 12.

The control unit 10 performs overall processing that is executed by the inter-device positional relationship estimation apparatus 1, and includes an analysis information acquisition unit 110, a recommendation processing unit 120, an initial map creation unit 130, a device relationship map creation unit 140, a service request reception unit 150, and an analysis device determination unit 160.

The analysis information acquisition unit 110 acquires data analysis information acquired by each device 5, which is sent from each device 5 in time series, and stores the data analysis information in the storage unit 12 as the time-series analysis information (record) 100. The analysis information acquired from each device 5 by the analysis information acquisition unit 110 includes at least general-purpose information (for example, information on people, vehicles, or the like). Further, when the device 5 analyzes detailed information or individual information, the information is also acquired. It is assumed that identification information of the device 5 is attached to the analysis information acquired from each device 5, and it is possible to identify whether the device 5 is a fixed device or a moving device based on the identification information.

When the initial map creation unit 130 creates the initial map 200, the analysis information acquisition unit 110 acquires the analysis information from each device 5, and then continues to acquire the analysis information at predetermined time intervals.

Further, the analysis information acquisition unit 110 requests each device 5 to provide the analysis information and acquires the analysis information at a desired target detection time (for example, the current point in time (t=0)) in a case in which the service request reception unit 150 receives a service request regarding the tracking of movement of an individual from the service portal 3.

When only general-purpose information (human, vehicles, or the like) is acquired as analysis information acquired at a certain time by the device 5, the recommendation processing unit 120 estimates information not directly analyzed by each device 5 applying a predetermined recommendation algorithm based on detailed information at another time of the same device 5, detailed information of another device 5, or the like. For this recommendation algorithm, the related art can be used and, for example, factorization machines may be used.

Figure 5:
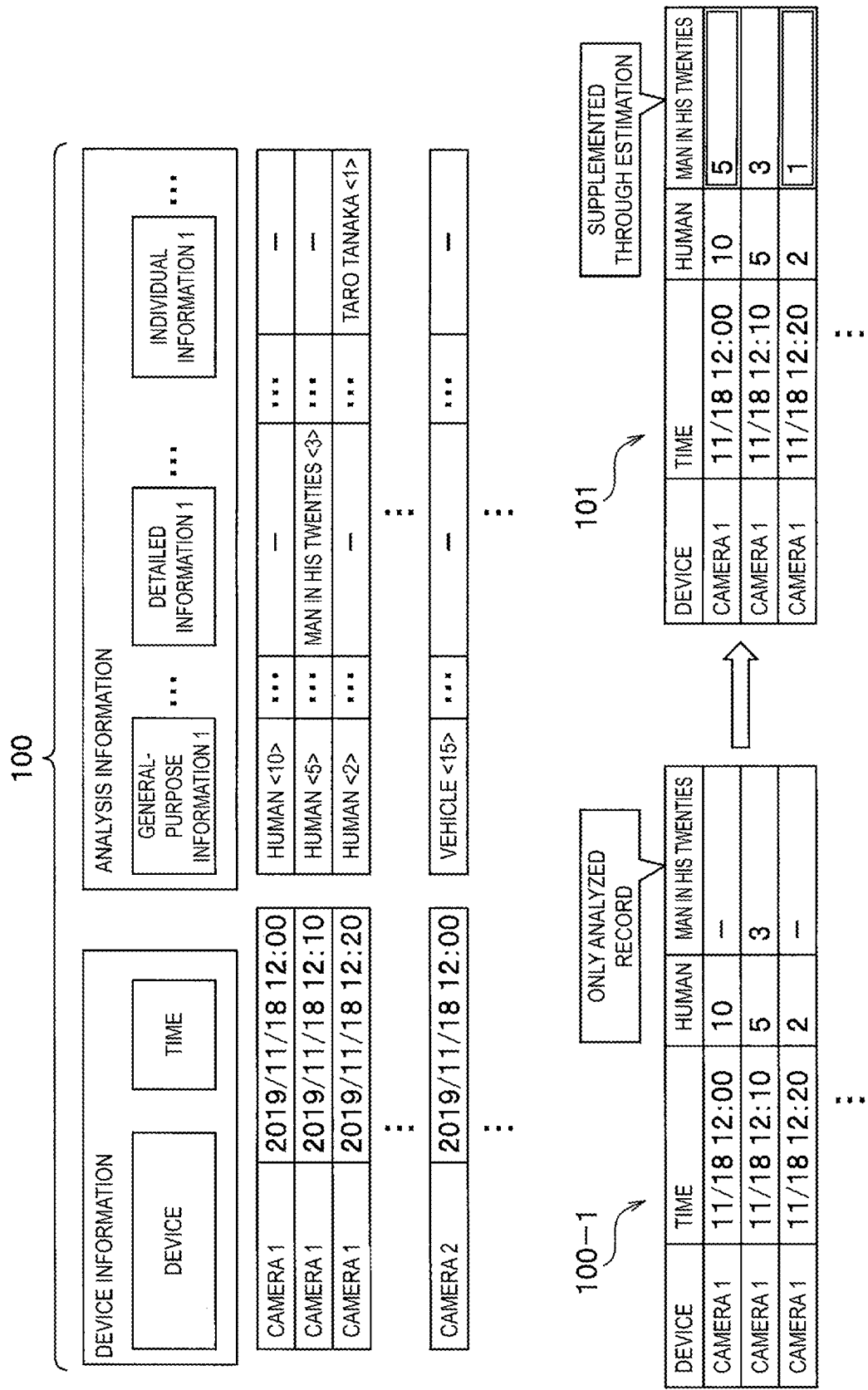
FIG. 5 is a diagram illustrating time-series analysis information according to the present embodiment.

It is assumed that, as illustrated in FIG. 5, as the information acquired from the device 5, the analysis information obtained at a certain time is stored as the time-series analysis information (record) 100 in association with the device (device identification information) and the time.

Here, for example, time-series analysis information 100-1 focusing on the device 5 of the camera "1" in FIG. 5 shows an analysis result that men in their twenties are "three persons" at 12:10 on November 18. On the other hand, analysis of detailed information (men in their twenties) has not been performed, for example, at 12:00 or 12:20. In such a case, the recommendation processing unit 120 applies the predetermined recommendation algorithm to perform information estimation and estimate information (detailed information) that has not been stored (analyzed). As a result of estimation applying the recommendation algorithm, the time-series analysis information (estimation) 101 illustrated in FIG. 5 shows, for example, that men in their twenties have been estimated to be "five persons" at 12:00 in the camera "1" and a man in his twenties has been estimated to be "one person" at 12:20.

Thus, when general-purpose information exists but detailed information does not exist for the time-series analysis information (record) 100 acquired from each device 5, the recommendation processing unit 120 applies the predetermined recommendation algorithm, estimates detailed information that has not been acquired, and stores the detailed information in the storage unit 12 as the time-series analysis information (estimation) 101.

When the initial map creation unit 130 creates the initial map 200, and when the time-series analysis information (record) 100 is then stored in the storage unit 12 at predetermined time intervals, the recommendation processing unit 120, by referring to the analysis information, performs estimation for the information for which detailed information is not stored. Further, in a case in which the service request reception unit 150 receives a service request regarding the tracking of the movement of the individual from the service portal 3, when the analysis information acquisition unit 110 stores the time-series analysis information (record) 100 in the storage unit 12, the recommendation processing unit 120 executes processing of estimating detailed information having no data in the time-series analysis information (record) 100 applying the predetermined recommendation algorithm.

Referring back to FIG. 4, the initial map creation unit 130, by using detailed information of a fixed device, which is statistically more likely than that of a moving device among the devices 5 of which the time-series analysis information (estimation) 101 has been generated by the recommendation processing unit 120, calculates neighborhood determination points (details will be described below) indicating a degree of correlation of the detailed information between the devices 5. The initial map creation unit 130 extracts the device 5 of which the calculated neighborhood determination points are equal to or higher than a predetermined threshold value (a first threshold value) as a neighboring device candidate. The initial map creation unit 130 calculates the detection probability and the movement time between the devices to create the initial map 200 based on time-series target detection information indicated by the detailed information of the extracted neighboring device candidate.

The initial map creation unit 130 includes a neighboring device candidate extraction unit 131 and a device relationship calculation unit 132.

The neighboring device candidate extraction unit 131 obtains a correlation between each device 5 (device i) and another device (device j) based on the detailed information of the fixed device and the detailed information estimated by the recommendation processing unit 120, which are obtained within a time slice (time width) corresponding to a certain time t. The neighboring device candidate extraction unit 131 calculates neighborhood determination points using Expression (1) below, and determines the neighborhood determination points as a neighboring device candidate when a predetermined condition is satisfied.

[Math. 1]

$$\sum_{t=-T}^{0} P(t)y_j(t) \quad \text{Expression (1)}$$

Here, P(t) indicates neighborhood determination points at time t (a relative value with the current time as 0), and a higher value is set when a time is closer to the current time. Further, $y_j(t)$ is a function that is set to "1" when the device i and the device j are determined to be similar in a time slice of time t, and "0" when the device i and the device j are determined not to be similar.

Here, a determination as to whether or not the device i and the device j are similar at a certain time is made by using, for example, a correlation between information obtained from the device i and the device j. The neighboring device candidate extraction unit 131, by using, for example, a Pearson correlation, calculates a correlation coefficient r, determines that the devices are similar when $0.7 \le r \le 1.0$, and determines that the devices are dissimilar in other cases.

Figure 6:
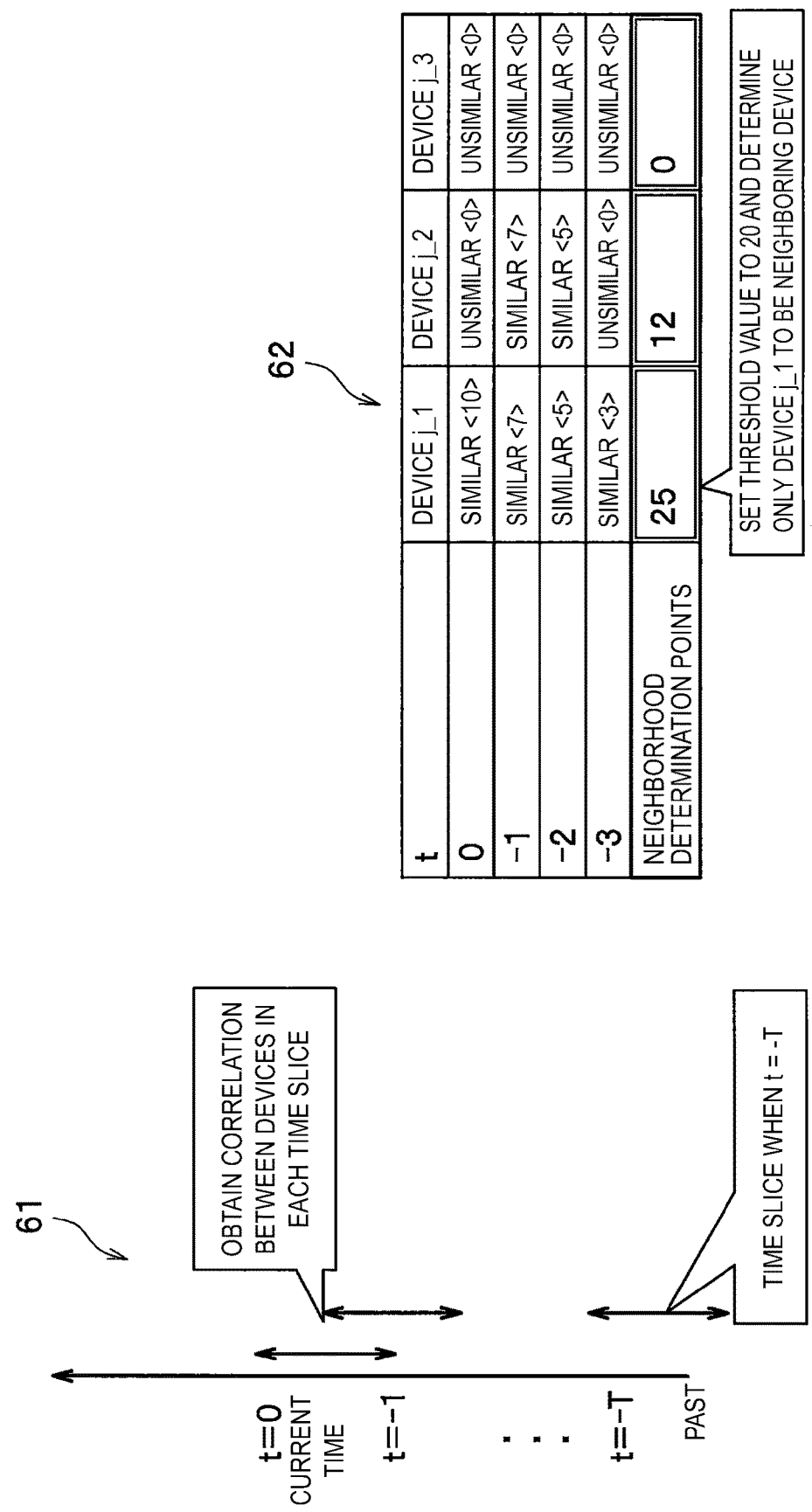
FIG. 6 is a diagram illustrating an example in which a neighboring device candidate is calculated by a neighboring device candidate extraction unit of the inter-device positional relationship estimation apparatus according to the present embodiment.

FIG. 6 is a diagram illustrating an example in which a neighboring device candidate is calculated by the neighboring device candidate extraction unit 131.

As indicated by reference sign 61 in FIG. 6, in a time slice (time width) between times "−T" and "0", any device i is selected from the respective devices 5, and the neighborhood determination points is calculated between the device i and the other device j using Expression (1) above. Reference sign 62 in FIG. 6 indicates an example in which calculation of Expression (1) has been performed on other devices j (devices j_1, j_2, and j_3 in FIG. 6) that are to be determined. Here, for example, the predetermined threshold value (the first threshold value) is set to "20", and the device j_1 having the neighborhood determination points "25" (a sum of P(t): 3+5+7+10) exceeding a threshold value "20" is extracted as a neighboring device candidate.

A predetermined condition for a determination to be neighboring device candidates is that at least the neighborhood determination points are equal to or larger than the predetermined threshold value (a first threshold value). Further, as another example, assuming that there are a large number of devices j for which the neighborhood determination points are equal to or larger than the predetermined threshold value, the upper device j having the neighborhood determination points equal to or larger than the predetermined threshold value may be determined to be the neighboring device candidate. Here, n devices j may be set as upper devices in order from a device with the highest neighborhood determination points, or devices of a predetermined proportion (m %) from the side with higher neighborhood determination points among the devices j of which the neighborhood determination points are equal to or larger than the threshold value may be set as upper devices j.

The neighboring device candidate extraction unit 131 extracts the device j that is a neighboring device candidate corresponding to each device i in this way.

Referring back to FIG. 4, the device relationship calculation unit 132 calculates a detection probability and a movement time between the devices for the detection information in a predetermined past period between the device i and the device j that is the neighboring device candidate extracted by the neighboring device candidate extraction unit 131.

For example, in the case of humans, an age, clothes, and the like of a person are used as detailed information. The detailed information is not guaranteed to be always available like general-purpose information, but is obtained through analysis at the time of use for a service. It can be assumed that the detailed information of humans is analyzed more frequently because the detailed information of humans is used for many services as compared with detailed information of things other than the human.

Figure 7:
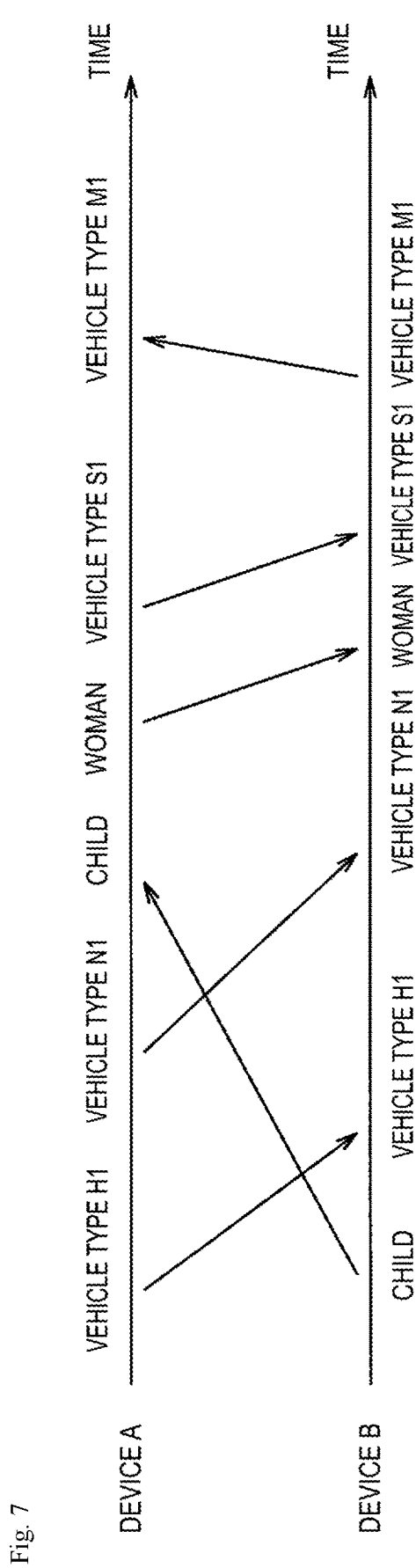
FIG. 7 is a diagram illustrating an example of calculation of a detection probability and a movement time between devices by a device relationship calculation unit of the inter-device positional relationship estimation apparatus according to the present embodiment.

FIG. 7 is a diagram illustrating an example of calculation of the detection probability and the movement time between the devices in the device relationship calculation unit 132. As illustrated in FIG. 7, a vehicle (for example, a vehicle type H1) detected by a device A is detected by a device B after a few seconds. A human (woman) detected by the device A is detected by the device B after a few minutes. Thus, by using the detailed information, a detection probability and a movement time of the "vehicle" and a detection probability and a movement time of the "human" are calculated. The "vehicle" and the "human" are targets between the devices A and B.

The detection probability and the movement time are calculated, for example, assuming that the vehicle detected by the device A is detected by the device B after 30 seconds with a probability of 50%. Average values may be adopted as the detection probability and the movement time in this case, or a shortest time may be adopted as the movement time. A method of calculating the detection probability and the movement time is arbitrarily set.

Then, the device relationship calculation unit 132 calculates the detection probability and the movement time between the devices with respect to a set of the device i and the device j that is the neighboring device candidate to create the initial map 200.

Referring back to FIG. 4, the device relationship map creation unit 140, by referring to the time-series analysis information (estimation) 101 including the detailed information estimated by the recommendation processing unit 120, calculates neighborhood points (details will be described below) indicating a degree of correlation of detailed information between the respective devices 5 including the moving device or/and a new fixed device. This neighborhood points are set to be higher when a time is closer to a current time as compared with the past, and a neighborhood points are set to be imparted to the device 5 present in a narrower range when a distance to the device 5 that is to be calculated obtained from the movement time of the target of the initial map 200 is closer to a current distance. The device relationship map creation unit 140 determines a device of which the calculated neighborhood points are equal to or higher than a predetermined threshold value (a second threshold value) to be the neighboring device. The device relationship map creation unit 140 calculates the detection probability and the movement time between the devices 5 based on the time-series target detection information indicated by the detailed information of the determined neighboring devices, and creates a device relationship map (see FIG. 9 to be described below).

The device relationship map creation unit 140 creates the device relationship map 300 at predetermined time intervals. Further, the device relationship map creation unit 140 creates (updates) the device relationship map 300 when information to which a new device including a moving device has been added is received from a network management apparatus (not illustrated), or when the inter-device positional relationship estimation apparatus 1 receives the service request regarding the tracking of the movement of the individual from the service portal 3.

The device relationship map creation unit 140 includes a neighboring device determination unit 141 and a device relationship calculation unit 142.

The neighboring device determination unit 141 calculates neighborhood points for the device 5 that is to be calculated using Expression (2) below, and determines the neighborhood points to be the neighboring device when a predetermined condition is satisfied.

[Math. 2]

$$\sum_{t=-T}^{0} w_t x_j(t) \qquad \text{Expression (2)}$$

Here, $\omega_t$ is a weight at time t (a relative value with the current time as 0), and a larger value is imparted when a time is closer to the present time. This is to emphasize information closer to a current time depending on certainty of information. T is an earliest time of a time slice that is to be calculated.

$x_j(t)$ is neighborhood points imparted to the device j at time t and is shown in Equation (3) below.

[Math. 3]

$$x_j(t) = \sum_{k}^{k \ni K(t)} P_t(j, k) \qquad \text{Equation (3)}$$

Here, $P_t(j, k)$ is a presence probability that the device i and the device j are present in the vicinity at T=0, which is estimated based on information on a distance (a sum of shortest path edge amounts) between a device k that has acquired the information similar to that of the device i at time t and a certain device j. Here, for example, 4 km/h is defined for a human, and a maximum speed of 100 km/h is defined for a vehicle (a vehicle-mounted camera), and a distance is calculated using a movement time imparted in the initial map 200. The movement speed may be estimated based on a video of the device. Further, any model can be adopted as a movement model, and for example, a probability model using a normal distribution may be adopted. In this case, a variance is larger when a time is a past time, and is smaller when a time is closer to a current time.

Further, K (t) is a set of devices 5 that have acquired information similar to that of the device i at time t.

The neighboring device determination unit 141 regards a likelihood of being a neighboring device at the current point in time as being high and imparts higher neighborhood points when the device is determined to be the neighboring device in a time closer to the current time based on Equations (2) and (3) above. Further, at time t, neighborhood points are also imparted to a device near the device determined to have acquired similar information. It is assumed that a range of neighborhood is narrower in a time closer to the current time.

Figure 8:
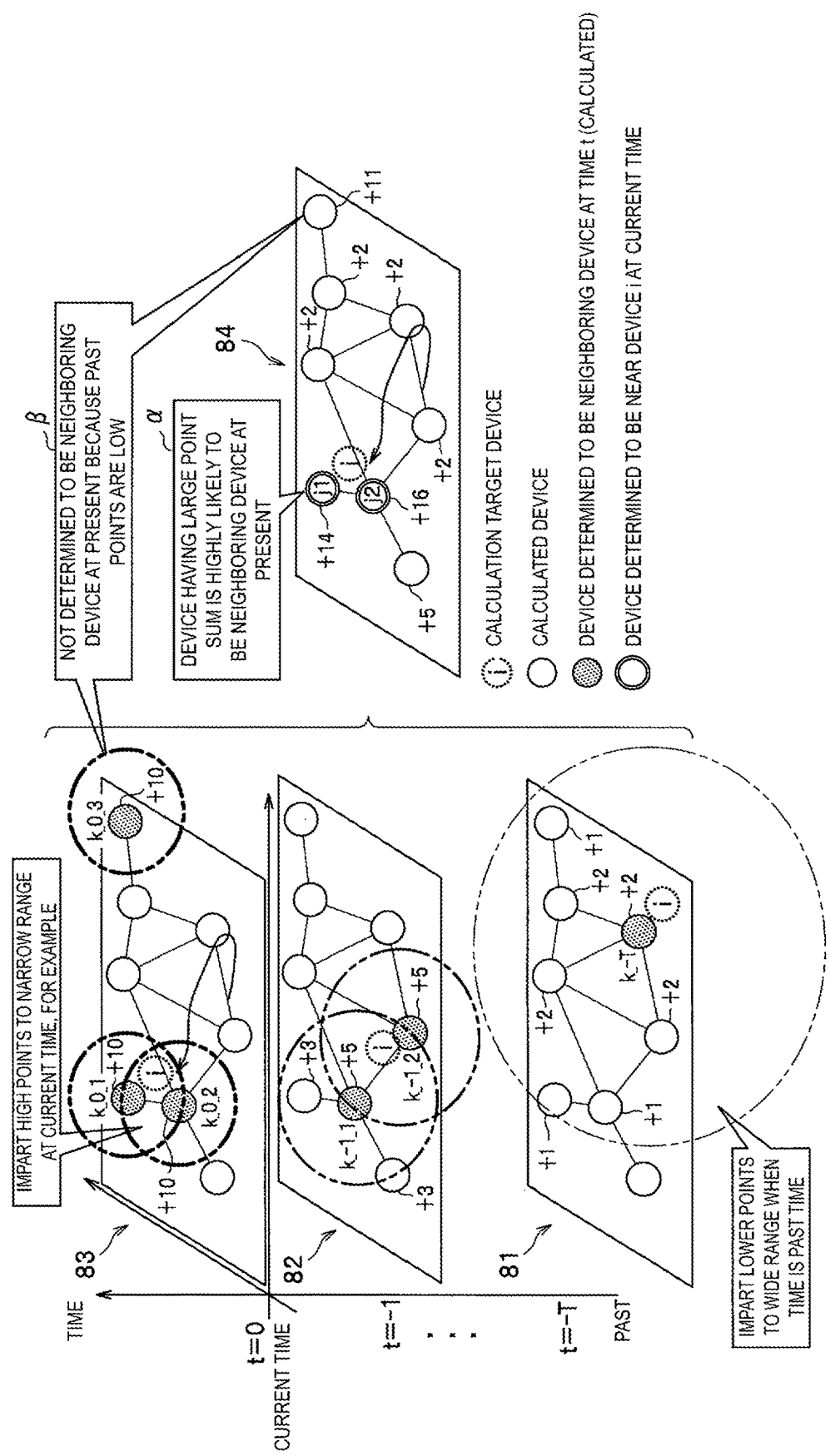
FIG. 8 is a diagram illustrating a determination of a neighboring device by a neighboring device determination unit of the inter-device positional relationship estimation apparatus according to the present embodiment.

FIG. 8 is a diagram illustrating the determination of the neighboring device in the neighboring device determination unit 141. Here, an example in which the device 5 that is to be calculated (a device to be calculated) is a moving device (device i) will be described.

As indicated by reference sign 81 in FIG. 8, a device k_−T is determined to be a neighboring device (neighborhood points: +2) of the device i that is the device to be calculated at time t=−T, and neighborhood points (+1 or +2) is also imparted to a device near the device k_−T. As indicated by reference sign 82 in FIG. 8, a device k_−1_1 and a device k_−1_2 are determined to be neighboring devices (neighborhood points: +5) of the device i at time t=−1, and neighborhood points (+3) is also imparted to devices near both the device k_−1_1 and the device k_−1_2. As indicated by reference sign 83 in FIG. 8, a device k_0_1, a device k_0_2, and a device k_0_3 are determined to be neighboring devices (neighborhood points: +10) of the device i at the current time t=0.

The neighboring device determination unit 141 sums the neighborhood points from time t=−T to 0 for each device. Reference sign 84 in FIG. 8 indicates a sum of the neighborhood points from the time from t=−T to t=0, and a device j1 (neighborhood points: 1+3+10=14) and a device j2 (neighborhood points: 1+5+10=16) having the neighborhood point equal to or higher than a predetermined threshold value (a second threshold value) (for example, neighborhood points=13) are calculated as neighboring devices. That is, a device having a large sum of neighborhood points is a device likely to be a neighboring device at a current time (t=0) (see reference sign α in FIG. 8).

By considering past information, it is possible to prevent an erroneous determination that devices that happen to have similar information at present are physically close to each other. In the example of FIG. 8, the device k_0_3 is determined to be a candidate for a neighboring device at time t=0 (reference sign 83) and the neighborhood points are "+10", but because past neighborhood points are low, a sum of the neighborhood points is "+11" (reference sign 84) and is smaller than a predetermined threshold value, and thus, the device is not determined to be a neighboring device at a current time (t=0) (see reference sign β in FIG. 8).

A predetermined condition for determining to be the neighboring device is that the neighborhood points are at least equal to or larger than the predetermined threshold value (the second threshold value). Further, as another example, assuming that there are a large number of devices j for which the neighborhood points are equal to or larger than the predetermined threshold value, the upper device j having the neighborhood points equal to or larger than the predetermined threshold value may be determined as the neighboring device. Here, n devices j may be set as upper devices in order from a device with the highest neighborhood points, or devices at a predetermined proportion (m %) from the side with higher neighborhood points among the devices j of which the neighborhood points are equal to or larger than the threshold value may be set as upper devices j.

The neighboring device determination unit 141 extracts the device j that is a neighboring device corresponding to each device i in this way.

Referring back to FIG. 4, the device relationship calculation unit 142 performs the same processing as the device relationship calculation unit 132 of the initial map creation unit 130 described above. That is, the device relationship calculation unit 142 calculates the detection probability and the movement time between the devices based on detection information in a predetermined period between the device i and the neighboring device (device j) at the current point in time determined by the neighboring device determination unit 141, and creates the device relationship map 300.

The service request reception unit 150 receives, as a service request, the device 5 that detects an individual to be tracked at a certain past time and information on the desired detection time (for example, the current time) as input values from the service portal 3.

The analysis device determination unit 160 outputs an instruction to create the device relationship map 300 in the information on the desired detection time (for example, a current time) to the device relationship map creation unit 140.

The analysis device determination unit 160 extracts neighboring devices reachable from the device 5 that has detected the individual within a time obtained by subtracting an individual detection time from the desired detection time by referring to the device relationship map 300. The analysis device determination unit 160 calculates a transition probability of being able to reach extracted neighboring device (details will be described below) using the detection probability for each route shown in the device relationship map 300, and determines the device 5 of which the calculated transition probability is equal to or higher than a predetermined threshold value (a third threshold value) to be the device 5 that is to be analyzed.

Specifically, the analysis device determination unit 160, by using the detection probability between the devices 5 determined to be neighboring devices, the movement time, and a known movement speed, which have already been obtained by the device relationship map 300, calculates a transition probability P (A, B, x, y). This transition probability P (A, B, x, y) indicates a probability of information being acquired by the device B after y hours for a target moving at a speed x for which information has been acquired by the device A. That is, x is a movement speed of the target, and y is a movement time.

A probability (a transition probability) that information is acquired by the device $C_N$ after y hours for a target moving at the speed x for which information is acquired by the device A is expressed using Expression (4) below when a transition occurs at an edge of $A \to C_1 \to \ldots \to C_{N-1} \to C_N$ between the device A and the device $C_N$.

[Math. 4]

$$\int_0^{y-t_1} \ldots \int_0^{y-t_1-t_2-\ldots-t_{n-1}} P(A,C_1,C_1,x,t_1)P(C_1,C_2,x,t_2) \ldots P(C_{N-1},C_N,x,t_n)dt_n dt_{n-1} \ldots dt_1 \quad \text{Expression (4)}$$

There may be a plurality of routes between devices A and $C_N$, and a sum of combinations of routes that can be taken from the device A to the device $C_N$ is obtained as a transition probability from the device A to the device $C_N$. The analysis device determination unit 160 calculates, for each neighboring device, a transition probability based on the device 5 that has detected an individual to be tracked at a certain past time, and determines a device of which the transition probability is equal to or higher than the predetermined threshold value (a third threshold value) to be a device on which data is to be analyzed.

Figure 9:
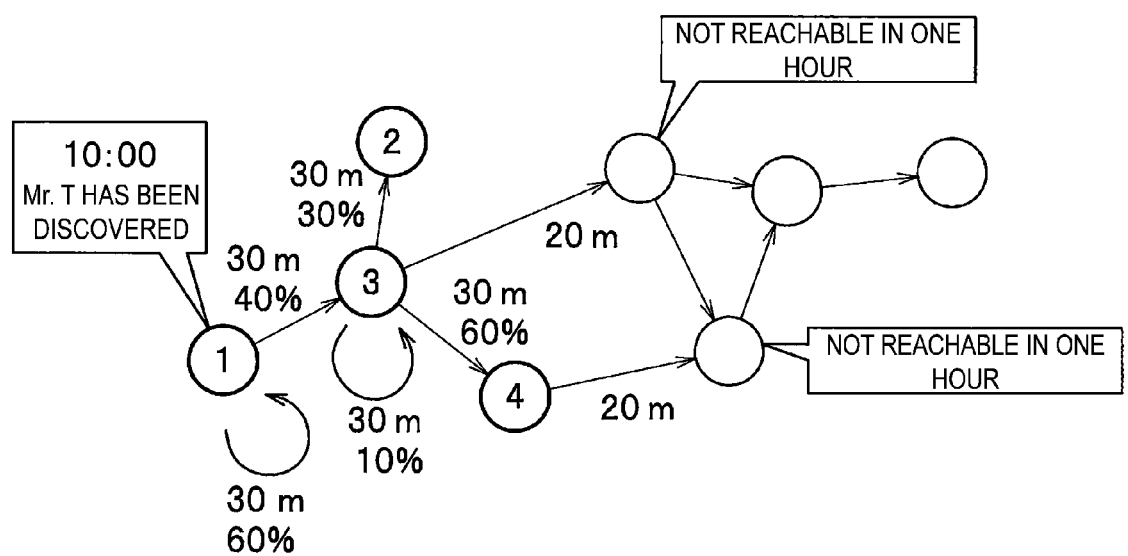
FIG. 9 is a diagram illustrating determination processing of a device to be analyzed by an analysis device determination unit of the inter-device positional relationship estimation apparatus according to the present embodiment.

FIG. 9 is a diagram illustrating processing for determining the analysis device to be analyzed, which is executed by the analysis device determination unit 160.

Here, it is assumed that the service request reception unit 150 obtains the information on Mr. T being discovered by the device "1" at 10:00 and a current time (11:00) one hour later as the desired detection time, as input values.

When the device relationship map 300 at the current point in time is created by the device relationship map creation unit 140 as illustrated in FIG. 9, there is a possibility that data can be captured from the following devices 1, 2, 3, and 4 at the current time (11:00) in consideration of a movement speed of Mr. T.

Device 1 . . . 0.6×0.6=0.36 (transition probability 36%)

Device 2 . . . 0.4×0.3=0.12 (transition probability 12%)

Device 3 . . . 0.6×0.4+0.4×0.1=0.28 (transition probability 28%) Device 4 . . . 0.4×0.6=0.24 (transition probability 24%)

For the device 1, the transition probability is 0.6×0.6 because a probability of staying in the device 1 for 30 minutes is 0.6 in one hour.

For the device 2, a transition probability is 0.4×0.3 because there is only a route of device 1→3→2 in one hour.

For the device 3, a sum of a case (0.6×0.4) in which the individual stays in the device 1 for 30 minutes and then moves to the device 3 in 30 minutes in one hour, and a case (0.4×0.1) in which the individual moves to the device 3 for 30 minutes and then stays in the device 3 for 30 minutes is a transition probability.

The device 4 has a transition probability of 0.4×0.6 because there is only a route of device 1→3→4 in one hour. Because there is no possibility that Mr. T can reach other devices in one hour, the transition probability becomes 0.

Thus, the analysis device determination unit 160 determines the device having the transition probability equal to or larger than the predetermined threshold value (the third threshold value) among the devices 5 of which the transition probabilities have been calculated, to be a device for analyzing data, by using the device relationship map 300. For example, in the example of FIG. 9, assuming that the predetermined threshold value of the transition probability is 20%, the devices 1, 3 and 4 are determined to be devices on which data analysis is to be formed (devices to be analyzed). The analysis device determination unit 160 transmits information on the determined device to be analyzed to the service portal 3.

Thus, with the inter-device positional relationship estimation apparatus 1 according to the present embodiment, it is possible to perform narrowing-down into the devices of which the transition probability is equal to or higher than the predetermined threshold value and from which the individual information is highly likely to be able to be acquired, and perform the analysis, unlike a case in which individual information is analyzed in all devices as in the related art. Thus, it is possible to efficiently narrow down the devices that can observe a moving target individual.

<Flow of Processing>

Next, a flow of processing executed by the inter-device positional relationship estimation apparatus 1 will be described.

The inter-device positional relationship estimation apparatus 1 executes, as processing for creating the device relationship map 300 at a certain time and estimating neighboring devices, (1) the creation of the initial map 200 based on the fixed device (initial map creation processing), (2) the updating of the map by adding a new device including a moving device (device relationship map creation processing), and (3) the determination of the device on which data is to be analyzed using the device relationship map 300 (device-to-be-analyzed determination processing), as described above. Hereinafter, each of the processing will be described with reference to FIGS. 10 to 12.

«Initial Map Creation Processing»

Figure 10:
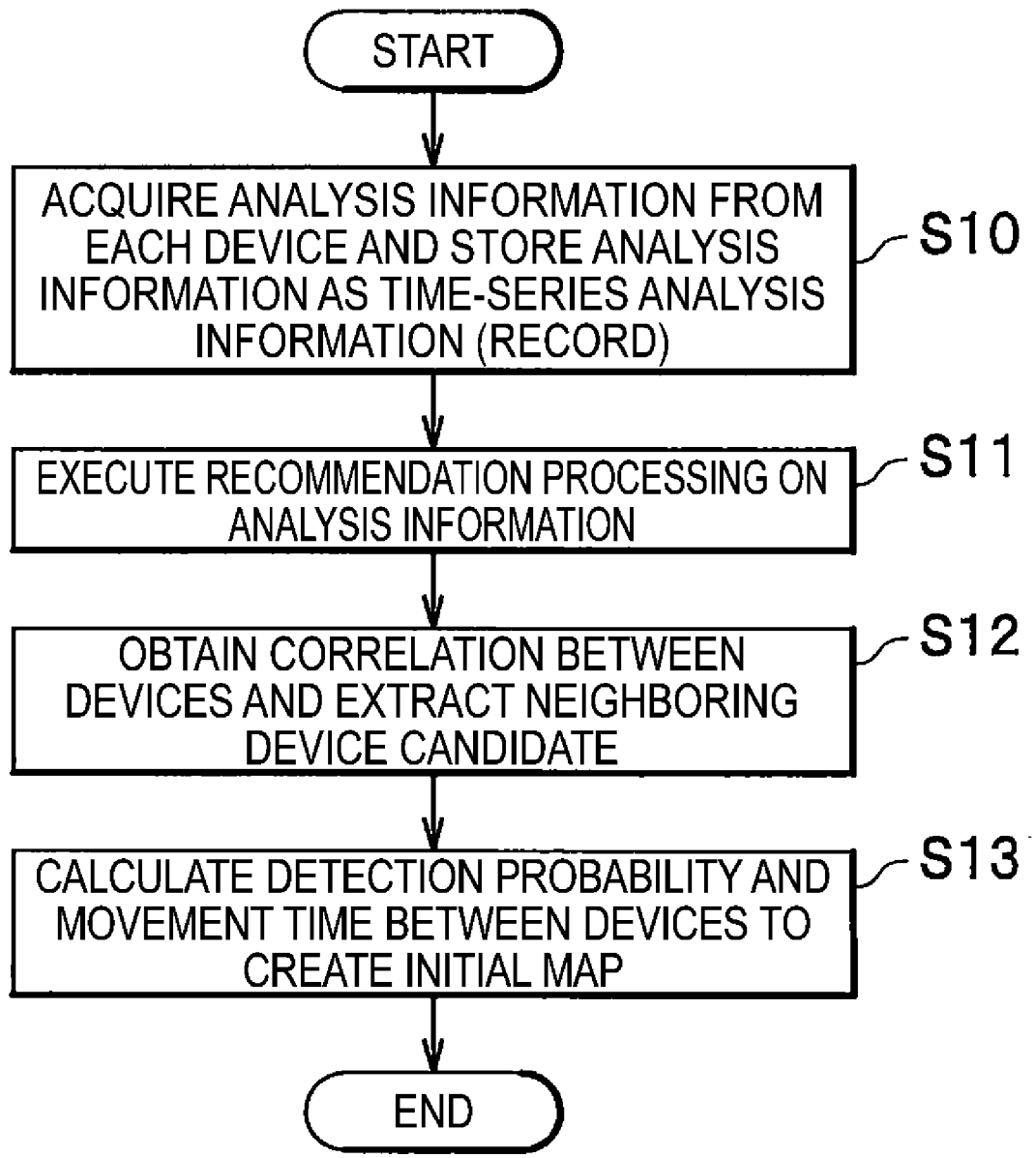
FIG. 10 is a flowchart illustrating a flow of initial map creation processing in the inter-device positional relationship estimation apparatus according to the present embodiment.

FIG. 10 is a flowchart illustrating a flow of initial map creation processing in the inter-device positional relationship estimation apparatus 1 according to the present embodiment. First, the inter-device positional relationship estimation apparatus 1 (the analysis information acquisition unit 110) acquires the data analysis information acquired by each device 5 sent from each device 5 in time series, and stores the data analysis information in the storage unit 12 as time-series analysis information (record) 100 (FIG. 4) (step S10).

Subsequently, the recommendation processing unit 120 of the inter-device positional relationship estimation apparatus 1, by referring to the time-series analysis information (record) 100 stored in the storage unit 12, executes the recommendation processing for estimating information (detailed information) not directly analyzed by each device 5 applying the predetermined recommendation algorithm based on detailed information at another time of the same the device 5, detailed information of another device 5, or the like when only general-purpose information (human, vehicles, or the like) is acquired as the analysis information acquired by the device 5 (step S11).

The recommendation processing unit 120 stores the analysis information including a result of estimating the detailed information in which the data does not exist in the time-series analysis information (record) 100 in the storage unit 12 as the time-series analysis information (estimation) 101.

Then, the initial map creation unit 130 (the neighboring device candidate extraction unit 131) of the inter-device positional relationship estimation apparatus 1, by referring to the time-series analysis information (estimation) 101 stored in the storage unit 12, obtains a correlation between each device 5 (device i) and another device (device j) based on the detailed information of the fixed device (including the detailed information estimated by the recommendation processing unit 120), which is obtained within a time slice (time width) corresponding to the certain time t. The neighboring device candidate extraction unit 131 calculates the neighborhood determination point using Expression (1) above and extracts the neighboring device candidate satisfying the above predetermined condition (step S12).

Subsequently, the device relationship calculation unit 132 of the initial map creation unit 130 calculates the detection probability and the movement time between the devices for the detection information in the predetermined past period between the device i and the device j that is the neighboring device candidate extracted by the neighboring device candidate extraction unit 131, and creates the initial map 200 (step S13).

The initial map creation unit 130 stores the created initial map 200 in the storage unit 12.

Thus, with the inter-device positional relationship estimation apparatus 1, it is possible to create an initial map indicating a positional relationship between devices by using detailed information of a fixed device that is statistically more likely than a moving device. In this initial map, the detection probability and the movement time between the devices determined to be neighboring device candidates are shown.

Device Relationship Map Creation Processing

Figure 11:
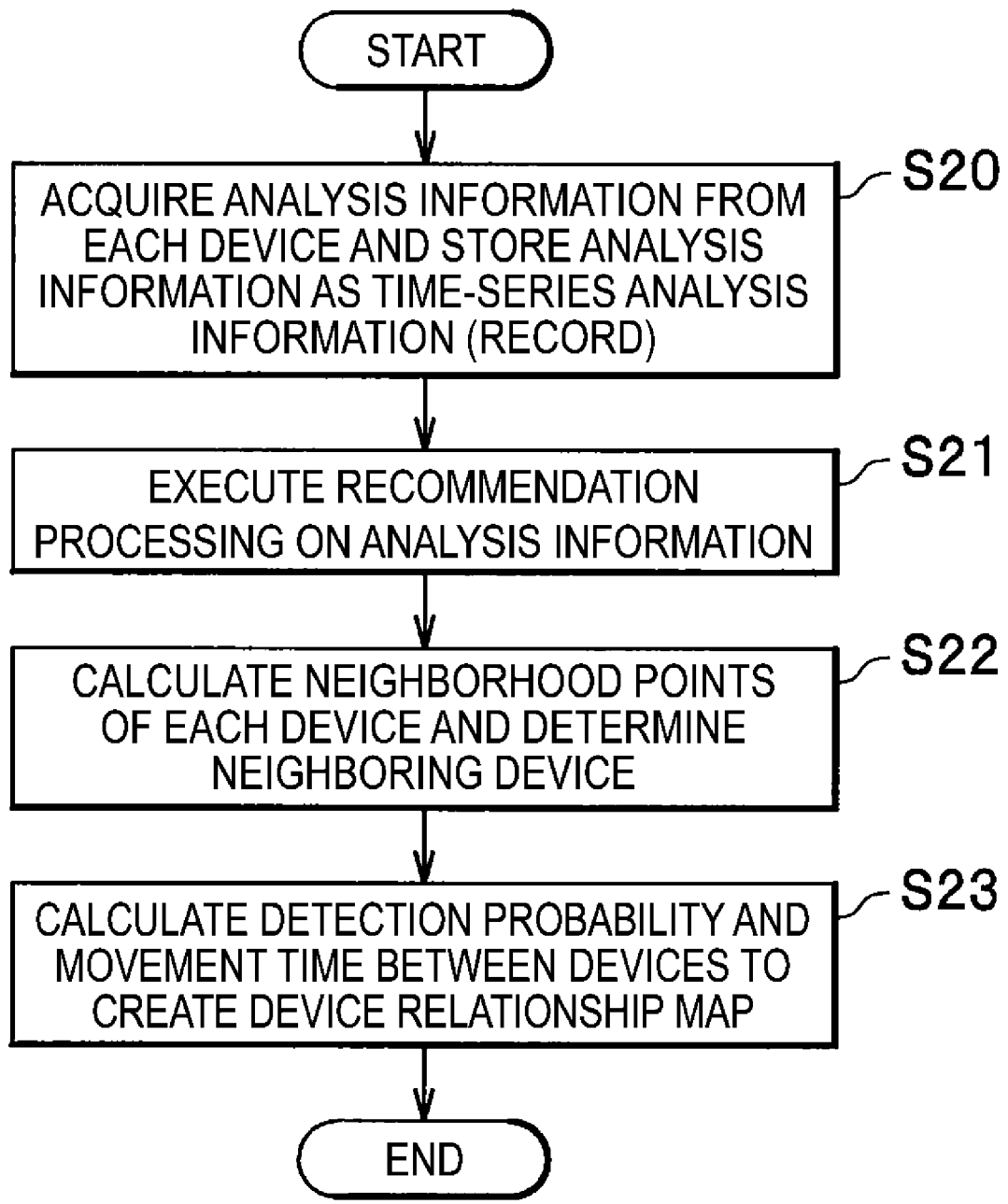
FIG. 11 is a flowchart illustrating a flow of device relationship map creation processing in the inter-device positional relationship estimation apparatus according to the present embodiment.

Next, processing of creating the device relationship map will be described. FIG. 11 is a flowchart illustrating a flow of the device relationship map creation processing in the inter-device positional relationship estimation apparatus 1 according to the present embodiment. Processing of creating the device relationship map 300 (FIG. 4) is performed at predetermined time intervals after the inter-device positional relationship estimation apparatus 1 creates the initial map 200 (FIG. 4). Further, this device relationship map creation processing is executed when information on a new device including a moving device is acquired or when the service request regarding the tracking of the movement of the individual is received from the service portal 3.

First, the analysis information acquisition unit 110 of the inter-device positional relationship estimation apparatus 1 acquires the analysis information at the current point in time from each device 5 and stores the analysis information in the storage unit 12 as time-series analysis information (record) 100 (FIG. 4) (step S20). In this case, when there is a new device 5 such as a moving device, the analysis information acquisition unit 110 also acquires analysis information from the new device 5.

Subsequently, the recommendation processing unit 120 of the inter-device positional relationship estimation apparatus 1, by referring to the time-series analysis information (record) 100 stored in the storage unit 12, executes the recommendation processing for estimating information (detailed information) not directly analyzed by each device 5 applying the predetermined recommendation algorithm based on detailed information at another time (past) of the same the device 5, detailed information of another device 5, or the like when only general-purpose information (human, vehicles, or the like) is acquired as the analysis information acquired by the device 5 (step S21).

The recommendation processing unit 120 stores the analysis information including the result of estimating the detailed information in which the data does not exist in the time-series analysis information (record) 100 in the storage unit 12 as the time-series analysis information (estimation) 101.

Then, the device relationship map creation unit 140 (the neighboring device determination unit 141) of the inter-device positional relationship estimation apparatus 1 calculates the neighborhood points of each device 5 using Equations (2) and (3), and determines the device to be a neighboring device when a predetermined condition is satisfied (step S22). Specifically, the neighboring device determination unit 141, by referring to the time-series analysis information (estimation) 101 stored in the storage unit 12, obtains a correlation between each device 5 (device i) and another device (device j) based on the detailed information of the device 5 (including the detailed information estimated by the recommendation processing unit 120), which is obtained within the time slice (time width) corresponding to the certain time t. The device relationship map creation unit 140 extracts the neighboring device candidate like the initial map creation unit 130 (the neighboring device candidate extraction unit 131). The neighboring device determination unit 141 regards a likelihood of being a neighboring device at the current point in time as being high and imparts higher neighborhood points when the device is determined to be the neighboring device in a time closer to the current time based on Equations (2) and (3) above. Further, at time t, neighborhood points are also imparted to a device near the device determined to have acquired similar information (the neighboring device candidate). It is assumed that a range of neighborhood is narrower in a time closer to the current time. The neighboring device determination unit 141 can determine a device having a large sum of neighborhood points, including past information, to be the neighboring device.

Subsequently, the device relationship calculation unit 142 of the device relationship map creation unit 140 calculates the detection probability and the movement time between the devices based on the detection information in the predetermined period between the devices, which is extracted by the neighboring device determination unit 141, and creates the device relationship map 300 (step S23).

The device relationship map creation unit 140 stores the created device relationship map 300 in the storage unit 12.

《Analysis Target Device Determination Processing》

Next, device-to-be-analyzed determination processing for determining a device on which data analysis is to be performed (a device to be analyzed) by using the device relationship map 300 will be described.

Figure 12:
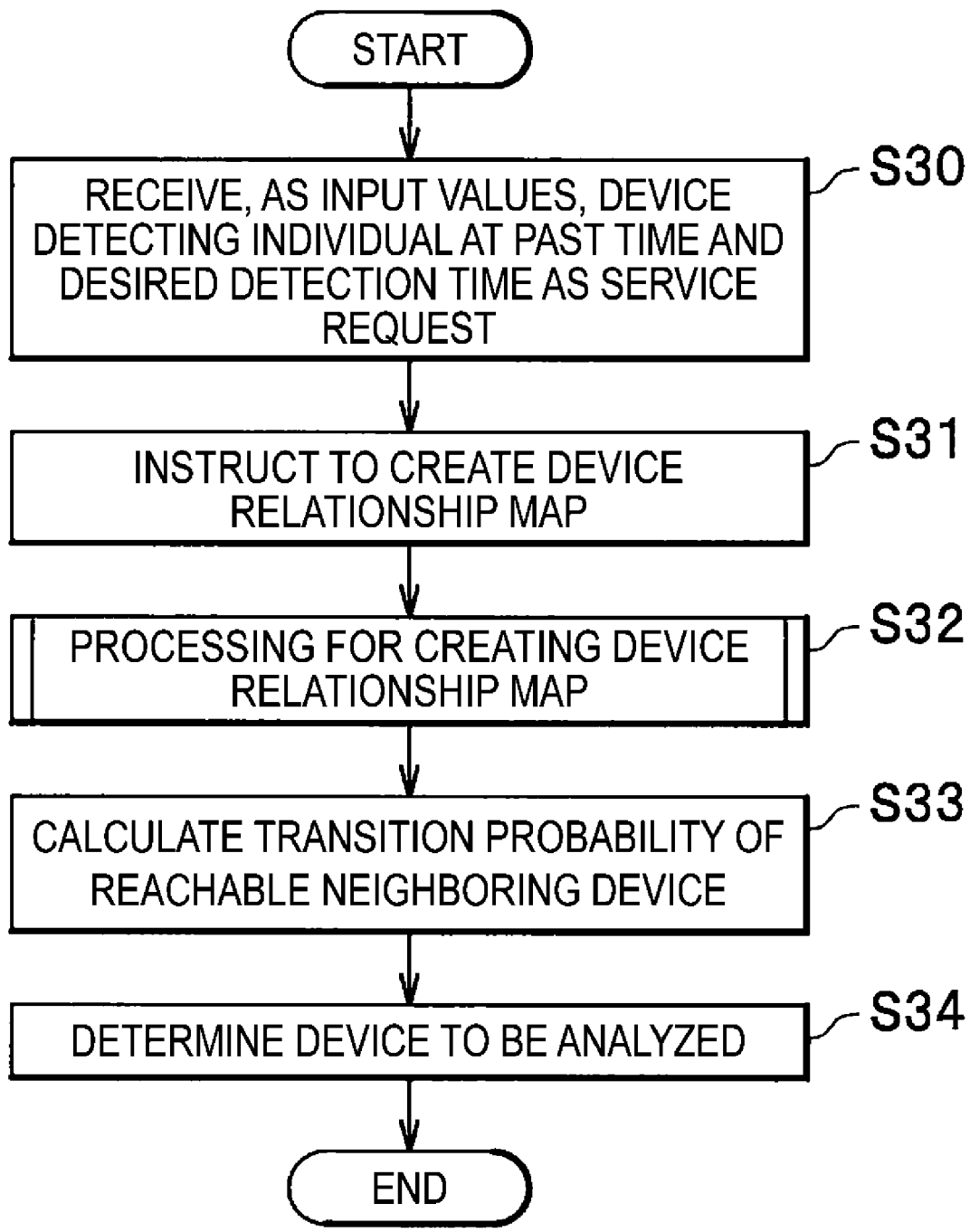
FIG. 12 is a flowchart illustrating a flow of device-to-be analyzed determination processing by the inter-device positional relationship estimation apparatus according to the present embodiment.

FIG. 12 is a flowchart illustrating a flow of the device-to-be analyzed determination processing in the inter-device positional relationship estimation apparatus 1 according to the present embodiment.

This device-to-be-analyzed determination processing is processing for identifying a device located near the device that has last discovered the target, based on the device relationship map 300 when the service request regarding the tracking of the movement of the individual is received, and narrowing down devices that are to be analyzed.

First, the service request reception unit 150 of the inter-device positional relationship estimation apparatus 1 receives, as input values, the device 5 that has detected an individual to be tracked at a certain past time and the information on the desired detection time (for example, a current time) as a service request from the service portal 3 (step S30).

Then, the analysis device determination unit 160 of the inter-device positional relationship estimation apparatus 1 outputs an instruction to create the device relationship map 300 at the desired detection time to the device relationship map creation unit 140 when the service request reception unit 150 receives the service request (step S31).

Subsequently, the device relationship map creation unit 140 executes the device relationship map creation processing (see FIG. 11) and creates the device relationship map 300 at the desired detection time (for example, the current time) (step S32).

When the desired detection time is a past time, and the device relationship map creation unit 140 has already created, the device relationship map 300 at the past time, for example, at the time of creation of the device relationship map 300 at predetermined time intervals and has stored the device relationship map 300 in the storage unit 12, the processing of step S32 is omitted.

The analysis device determination unit 160 calculates a combination of routes from the device 5 that detected the individual in the past obtained as an input value to a neighboring device that can be reached within a time obtained by subtracting a past detection time from the desired detection time (for example, the current time) based on the device relationship map 300. The analysis device determination unit 160 calculates the transition probability (see Expression (4) above) for each neighboring device that can be reached (step S33).

Subsequently, the analysis device determination unit 160 determines the device having the transition probability equal to or larger than the predetermined threshold value (the third threshold value) among the devices 5 of which the transition probability has been calculated, to be a device for analyzing data (device to be analyzed) (step S34).

The analysis device determination unit 160 transmits information on the determined device to be analyzed to the service portal 3 and ends the processing.

By doing so, with the inter-device positional relationship estimation apparatus 1 according to the present embodiment, it is possible to perform narrowing-down into the devices of which the transition probability is equal to or higher than the predetermined threshold value and from which the individual information is highly likely to be able to be acquired, and perform the analysis. Thus, it is possible to efficiently narrow down the devices that can observe a moving target individual.

<Hardware Configuration>

Figure 13:
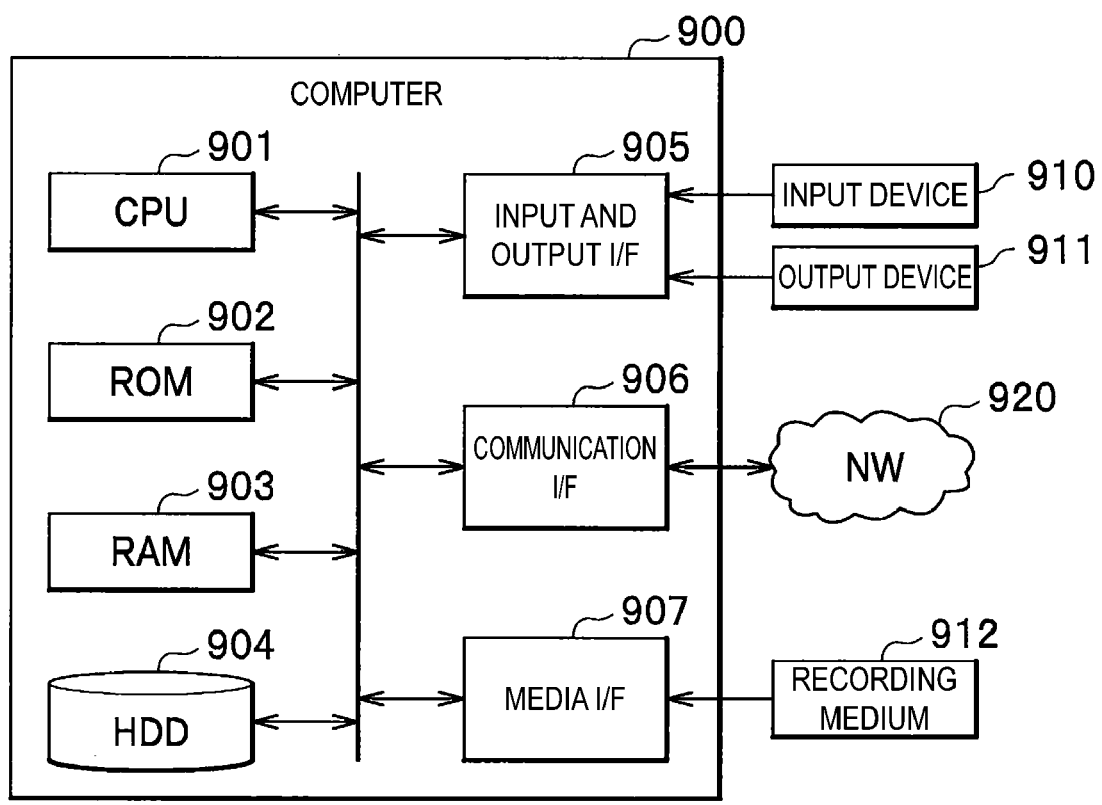
FIG. 13 is a hardware configuration diagram illustrating an example of a computer that realizes a function of the inter-device positional relationship estimation apparatus according to the present embodiment.

The inter-device positional relationship estimation apparatus 1 according to the present embodiment is realized by, for example, a computer 900 having a configuration as illustrated in FIG. 13.

FIG. 13 is a hardware configuration diagram illustrating an example of the computer 900 that realizes a function of the inter-device positional relationship estimation apparatus 1 according to the present embodiment. The computer 900 includes a central processing unit (CPU) 901, a read only memory (ROM) 902, a random access memory (RAM) 903, a hard disk drive (HDD) 904, an input and output interface (I/F) 905, a communication I/F 906. and a media I/F 907.

The CPU 901 operates based on the program stored in the ROM 902 or the HDD 904, and performs control using the control unit 10 of FIG. 4. The ROM 902 stores a boot program executed by the CPU 901 when the computer 900 is started, a program relevant to hardware of the computer 900, and the like.

The CPU 901 controls an input device 910 such as a mouse or a keyboard, and an output device 911 such as a display or a printer via an input and output I/F 905. The CPU 901 acquires data from the input device 910 via the input and output I/F 905, and outputs generated data to the output device 911.

The HDD 904 stores a program executed by the CPU 901, data used by the program, and the like. The communication I/F 906 receives data from another device (for example, the service portal 3 or each device 5) that is not illustrated via a communication network (for example, a network 920), outputs the data to the CPU 901, and transmits data generated by the CPU 901 to another device via the communication network.

The media I/F 907 reads a program or data stored in a recording medium 912 and outputs the program or data to the CPU 901 via a RAM 903. The CPU 901 loads a program relevant to objective processing into the RAM 903 from the recording medium 912 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, when the computer 900 functions as the inter-device positional relationship estimation apparatus 1 according to the present embodiment, the CPU 901 of the computer 900 executes the program loaded into the RAM 903 to realize a function of the inter-device positional relationship estimation apparatus 1. Further, data in the RAM 903 is stored in the HDD 904. The CPU 901 reads the program relevant to the objective processing from the recording medium 912 and executes the program. In addition, the CPU 901 may read the program relevant to the objective processing from another device via a communication network (the network 920).

<Advantageous Effects>

Hereinafter, advantageous effects of the inter-device positional relationship estimation apparatus according to the present invention will be described.

The inter-device positional relationship estimation apparatus according to the present invention includes the analysis information acquisition unit 110 configured to acquire time-series analysis information of a target to be photographed obtained by each device 5, as time-series analysis information (record) 100; the recommendation processing unit 120 configured to, when detailed information indicating features of the target is not analyzed at a certain time in the time-series analysis information (record) 100, by using detailed information of another time of the same device and detailed information of another device different from the device, estimate unanalyzed detailed information applying a predetermined recommendation algorithm and generate time-series analysis information (estimation) 101 including the estimated detailed information; the initial map creation unit 130 configured to, by referring to the time-series analysis information (estimation) 101 including the estimated detailed information, calculate a neighborhood determination point indicating a degree of correlation of the detailed information between fixed devices among the devices 5, extract the devices 5 of which the calculated neighborhood determination point is equal to or larger than a predetermined first threshold value as neighboring device candidates, and calculate a detection probability between the devices 5 and a movement time between the devices 5 based on time-series target detection information indicated by the detailed information of the extracted neighboring device candidates to create the initial map 200; and the device relationship map creation unit 140 configured to, by referring to the time-series analysis information (estimation) 101 including the estimated detailed information, set and calculate neighborhood points indicating a degree of correlation of detailed information between the devices 5 including a moving device or/and a new fixed device to be higher when a time is closer to a current time as compared with the past and to be imparted to the device 5 present in a narrower range when a distance to a device to be calculated obtained from a movement time of the target of the initial map 200 is closer to a current distance, determine the device 5 of which the calculated neighborhood points are equal to or larger than a predetermined second threshold value to be a neighboring device, and calculate a detection probability between the devices 5 and a movement time between the devices 5 based on time-series target detection information indicated by the detailed information of the determined neighboring device to create the device relationship map 300.

By doing so, the inter-device positional relationship estimation apparatus 1 can estimate the positional relationship between the devices 5 without using a position detection means such as a GPS.

Further, the inter-device positional relationship estimation apparatus further includes the service request reception unit 150 configured to receive a service request including information on a device 5 detecting an individual as a target to be tracked at a certain past time and information on a desired individual detection time, and an analysis device determination unit 160 configured to extract the neighboring devices reachable from the device detecting the individual within a time obtained by subtracting an individual detection time from the desired detection time by referring to the device relationship map 300, calculate a transition probability of being able to reach the extracted neighboring device using the detection probability for each route shown in the device relationship map 300, and determine a device of which the calculated transition probability is equal to or higher than the predetermined third threshold value to be a device to be analyzed.

Thus, with the inter-device positional relationship estimation apparatus 1, it is possible to efficiently narrow down the devices that can observe a moving target individual.

The present invention is not limited to the embodiments described above, and many modifications can be made by those skilled in the art within a technical idea of the present invention.

For example, in the present embodiment, a case in which the analysis device determination unit 160 of the inter-device positional relationship estimation apparatus 1 transmits information on the determined device to be determined to the service portal 3 has been described. On the other hand, the inter-device positional relationship estimation apparatus 1 may include an analysis APL distribution unit to directly distribute an analysis application (APL) to the determined device to be analyzed.

REFERENCE SIGNS LIST

1 Inter-device positional relationship estimation apparatus
3 Service portal
5 Device
10 Control unit
11 Input and output unit
12 Storage unit
100 Time-series analysis information (record)
101 Time-series analysis information (estimation)
110 Analysis information acquisition unit
120 Recommendation processing unit
130 Initial map creation unit
131 Neighboring device candidate extraction unit
132, 142 Device relationship calculation unit
140 Device relationship map creation unit
141 Neighboring device determination unit
150 Service request reception unit
160 Analysis device determination unit

The invention claimed is:

1. An inter-device positional relationship estimation apparatus comprising:
   an analysis information acquisition unit, including one or more processors, configured to acquire time-series analysis information of a target to be photographed obtained by each device, as time-series analysis information;
   a recommendation processing unit, including one or more processors, configured to, when detailed information indicating features of the target is not analyzed at a certain time in the time-series analysis information, by using detailed information of another time of the same device and detailed information of another device different from the device, estimate unanalyzed detailed information applying a predetermined recommendation algorithm, and generate time-series analysis information including the estimated detailed information;
   an initial map creation unit, including one or more processors, configured to, by referring to the time-series analysis information including the estimated detailed information, calculate a neighborhood determination point indicating a degree of correlation of the detailed information between fixed devices among the devices, extract the devices of which the calculated neighborhood determination point is equal to or larger than a predetermined first threshold value as neighboring device candidates, and calculate a detection probability between the devices and a movement time between the devices based on time-series target detection information indicated by the detailed information of the extracted neighboring device candidates to create an initial map; and
   a device relationship map creation unit, including one or more processors, configured to, by referring to the time-series analysis information including the estimated detailed information, set and calculate neighborhood points indicating a degree of correlation of detailed information between the devices including a moving device or/and a new fixed device to be higher when a time is closer to a current time as compared with the past and to be imparted to the device present in a narrower range when a distance to a device to be calculated obtained from a movement time of the target of the initial map is closer to a current distance, determine the device of which the calculated neighborhood points are equal to or larger than a predetermined second threshold value to be a neighboring device, and calculate a detection probability between the devices and a movement time between the devices based on time-series target detection information indicated by the detailed information of the determined neighboring device to create a device relationship map.

2. The inter-device positional relationship estimation apparatus according to claim 1, further comprising:
   a service request reception unit, including one or more processors, configured to receive a service request including information on a device detecting an individual as a target to be tracked at a certain past time and information on a desired individual detection time; and
   an analysis device determination unit, including one or more processors, configured to extract the neighboring devices reachable from the device detecting the individual within a time obtained by subtracting the individual detection time from the desired detection time by referring to the device relationship map, calculate a transition probability of being able to reach the extracted neighboring device using the detection probability for each route shown in the device relationship map, and determine a device of which the calculated transition probability is equal to or higher than a predetermined third threshold value to be a device to be analyzed.

3. An inter-device positional relationship estimation method at an inter-device positional relationship estimation apparatus, the inter-device positional relationship estimation method comprising:
   acquiring time-series analysis information of a target to be photographed obtained by each device, as time-series analysis information;
   when detailed information indicating features of the target is not analyzed at a certain time in the time-series analysis information, by using detailed information of another time of the same device and detailed information of another device different from the device, estimating unanalyzed detailed information applying a predetermined recommendation algorithm, and generating time-series analysis information including the estimated detailed information;
   by referring to the time-series analysis information including the estimated detailed information, calculating a neighborhood determination point indicating a degree of correlation of the detailed information between fixed devices among the devices, extracting the devices of which the calculated neighborhood determination point is equal to or larger than a predetermined first threshold value as neighboring device candidates, and calculating a detection probability between devices and a movement time between the devices based on the time-series target detection information indicated by the detailed information of the extracted neighboring device candidates to create an initial map; and
   by referring to the time-series analysis information including the estimated detailed information, setting and calculating neighborhood points indicating a degree of correlation of detailed information between the devices including a moving device or/and a new fixed device to be higher when a time is closer to a current time as compared with the past and to be imparted to the device present in a narrower range when a distance to a device to be calculated obtained from a movement time of the target of the initial map is closer to a current distance, determining the device of which the calculated neighborhood points are equal to or larger than a predetermined second threshold value to be a neighboring device, and calculating a detection probability between the devices and a movement time between the devices based on time-series target detection information indicated by the detailed information of the determined neighboring device to create a device relationship map.

4. The inter-device positional relationship estimation method according to claim 3, further comprising, at the inter-device positional relationship estimation apparatus:

receiving a service request including information on a device detecting an individual as a target to be tracked at a certain past time and information on a desired individual detection time; and extracting the neighboring devices reachable from the device detecting the individual within a time obtained by subtracting the individual detection time from the desired detection time by referring to the device relationship map, calculating a transition probability of being able to reach the extracted neighboring device using the detection probability for each route shown in the device relationship map, and determining a device of which the calculated transition probability is equal to or higher than a predetermined third threshold value to be a device to be analyzed.

5. A non-transitory computer readable medium storing a computer program for causing a computer to execute the inter-device positional relationship estimation method according to claim 3.

6. A non-transitory computer readable medium storing a computer program for causing a computer to execute the inter-device positional relationship estimation method according to claim 4.

* * * * *